United States Patent [19]

Rabatin

[11] 3,936,644

[45] Feb. 3, 1976

[54] MULTI-LAYER X-RAY SCREENS

[75] Inventor: Jacob G. Rabatin, Chardon, Ohio

[73] Assignee: General Electric Company, Schenectady, N.Y.

[22] Filed: Mar. 14, 1974

[21] Appl. No.: 451,102

[52] U.S. Cl. .................. 250/486; 250/460; 250/488
[51] Int. Cl.² ........................ G01J 1/58; G01N 21/52
[58] Field of Search ........... 250/458, 460, 486, 487, 250/488, 483

[56] References Cited

UNITED STATES PATENTS

| | | | |
|---|---|---|---|
| 3,617,743 | 11/1971 | Rabatin | 250/483 |
| 3,717,764 | 2/1973 | Fujimura | 250/486 |
| 3,725,704 | 3/1973 | Buchanan | 250/460 |
| 3,795,814 | 3/1974 | Rabatin | 250/458 |

*Primary Examiner*—Harold A. Dixon
*Attorney, Agent, or Firm*—John F. McDevitt; Lawrence R. Kempton; Frank L. Neuhauser

[57] ABSTRACT

An X-ray intensifying screen having reduced radiographic mottle comprising a plurality of layers including a photographic film and two or more phosphor layers, the phosphor layers having increasing luminous efficiency, under X-ray radiation, from the layer nearest the photographic film to the outermost layer from said film. The luminous efficiencies are adjusted to cause about equal film densities, on absorption of about equal X-rays for each phosphor layer. Thus, the total density of the phosphor layers would be about equal to the film density of a single phosphor layer comprising a similar phosphor of homogeneous brightness.

7 Claims, 4 Drawing Figures

MULTI-LAYER X-RAY SCREENS

BACKGROUND OF THE INVENTION

This invention relates to the construction of improved X-ray intensifying screens useful for medical radiography, said screens having the effect of reducing the graininess due to quantum mottle in the images reproduced on silver halide film and thereby improving image quality. The quantum mottle has the effect of obscuring fine details in the images of the object exposed to medical radiography by the nature of the statistical process of absorption of X-rays in the intensifying screen. The resulting image has a non-uniform darkening which is observed as a film graininess on the order of about 0.01 $mm^2$ size variations noticeable to the eye.

The present invention reduces this problem of quantum mottle by means of screens with two or more contiguous phosphor layer constructed in such a manner that the layers are of increasing luminous efficiency under X-ray excitation from the phosphor layer nearest the film to the outermost phosphor layer from said film which is customarily disposed nearest a reflector layer.

In contrast, the prior art screens are constructed of a single homogeneous phosphor layer of uniform brightness and consequently the greater degree of quantum mottle is caused primarily by the exposure of the film to bright emission of particles nearest the film and thus fewer absorbed X-ray photons are needed in the process leading to greater quantum mottle.

SUMMARY OF THE INVENTION

It is therefore an object of the present invention to reduce radiographic mottle in an X-ray screen.

Another object of the invention is to provide an X-ray screen having a plurality of critically located phosphor layers.

Briefly stated, the present invention relates to reducing quantum mottle by the use of two or more contiguous phosphor layers such that the phosphor layer nearest the film provides film exposure not greater than the layers further removed from the film and in this manner improves the effect on film exposure of phosphor particles farthest removed from the film and at the same time reducing the effect of the phosphor particles nearest the film. By reducing the luminous efficiency of the phosphor layer nearest the film and correspondingly increasing the luminous efficiency of the phosphor layer furthest from the film, with exposure the same as that for a homogeneous single layer, a significant important reduction in film graininess or quantum mottle is achieved resulting in improved image quality permitting the examination of finer details by the radiologist. Further, the phosphor layers are of different atomic elements such that the phosphors in the outermost layer from the film are comprised of one or more elements with atomic numbers less than 64 and layers nearest the film are comprised of one or more elements with atomic numbers greater than 58.

Those parts of the present invention which are considered to be new are set forth in detail in the claims appended hereto. The invention, however, may be better understood and further objects and advantages thereof appreciated from a consideration of the drawings and detailed description.

DETAILED DESCRIPTION

The present invention will be hereinafter described in greater detail with references to the accompanying drawings:

FIG. 1 is a schematic showing in section of one means for practicing the invention.

FIG. 1*a* is a cross section of an enlarged view of the screen film arrangement.

Figure 1:
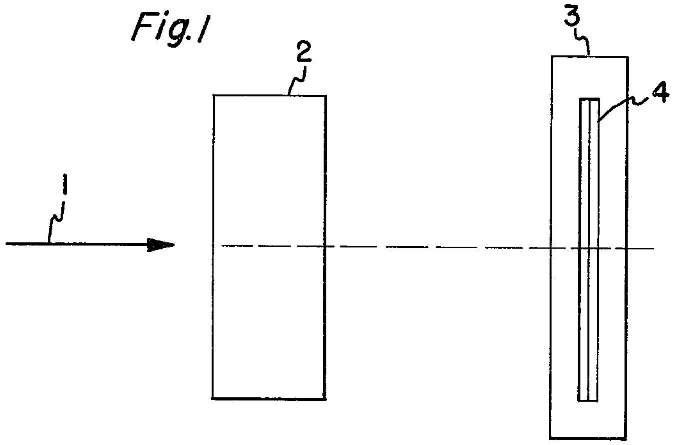

Refer more particularly to FIG. 1 which shows the construction details of an X-ray intensifying screencassette system which is quite similar to the presently used devices. As shown schematically in FIG. 1, the X-ray beam 1, after having passed through an object 2, enters a light tight cassette 3, in which the image is recorded by the screen film arrangement 4. Object 2 for the purpose of this invention is part of the human body which due to its particular structure absorbs part of the X-ray beam in a spatially non-uniform fashion, thus giving rise to an invisible X-ray image. A fraction of this X-ray image is converted to a visible image by the screen-film arrangement 4.

Figure 1A:
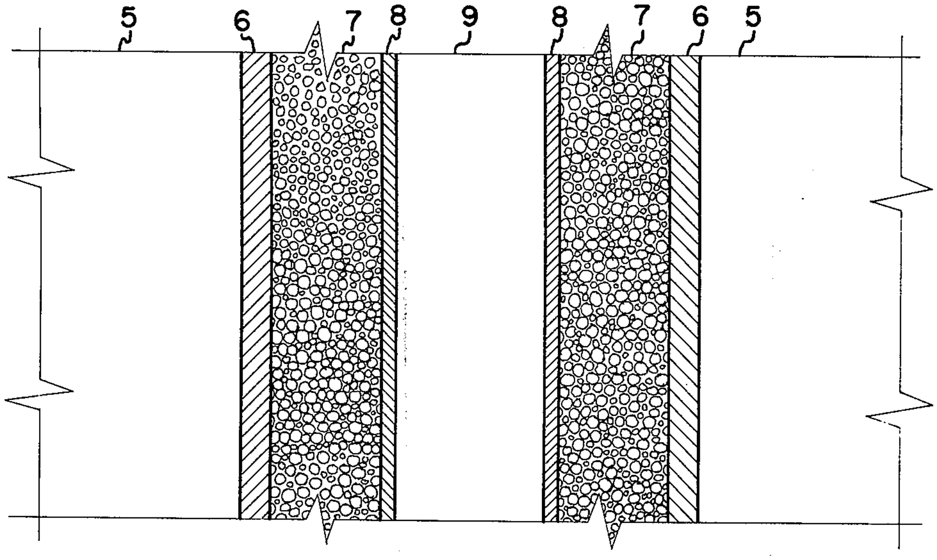

FIG. 1a shows an arrangement consisting of a double emulsion photographic film 9 which is sandwiched between two X-ray intensifying screens. The screens are constructed of a flexible backing 5, a reflector layer 6, a phosphor layer 7 to which this invention relates and a transparent top layer 8.

Figure 2:
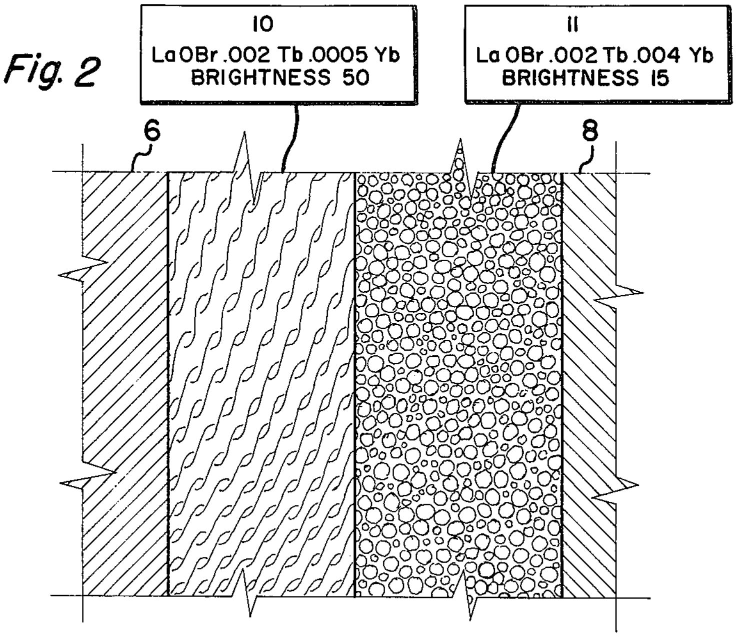
FIG. 2 is an enlarged cross section of a plurality of phosphor layers.

FIG. 2 shows the construction of a screen composed of two contiguous 50 micron thick phosphor layers 10, 11 embedded in a polymeric matrix. Phosphor layer 10 is composed of LaOBr.002Tb.0005 Yb phosphor of brightness 50. Phosphor layer 11 is composed of a LaOBr.002Tb.004Yb of brightness 15. X-ray screens constructed according to this example had speeds 2.0 times faster than medium speed calcium tungstate screens with a 14% reduction in quantum mottle. Both FIGS. 2 and 3 show two examples of the invention as related to the phosphor layer 7.

Figure 3:
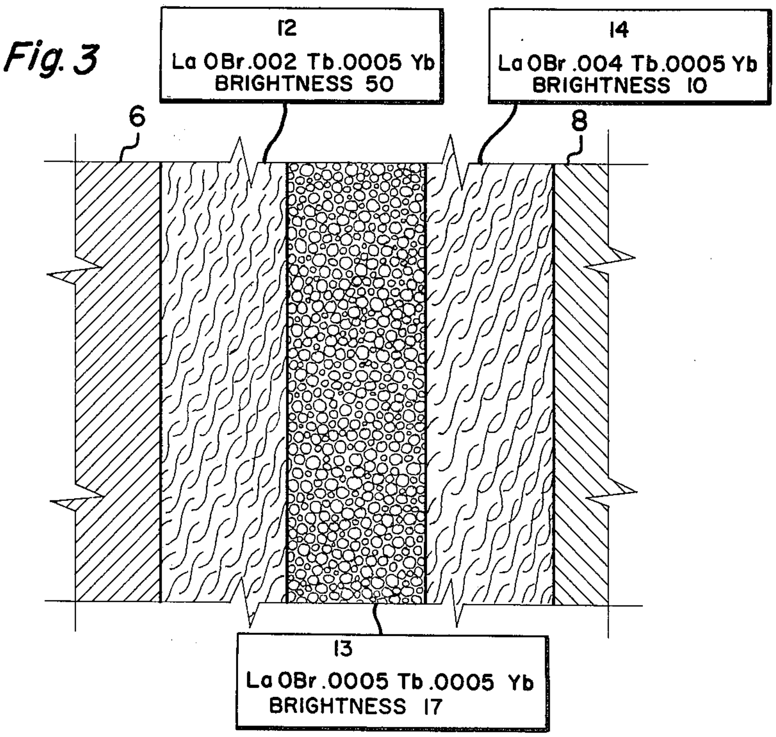
FIG. 3 shows an enlarged cross section of contiguous phosphor layers embedded in a polymeric matrix.

FIG. 3 shows the construction of a screen composed of three contiguous 33 micron thick phosphor layers 12, 13, 14, embedded in a polymeric matrix. Phosphor layer 12 is composed of LaOBr.002Tb.0005Yb brightness 50; phosphor layer 13 is composed of LaOBr.0005Tb.0005Yb brightness 17; and phosphor layer 14 is composed of LaOBr.004Tb.0005Yb brightness 10.

X-ray screens constructed according to this example had speeds of 2.0 as compared to medium speed $CaWO_4$ screens and an 18% reduction in quantum mottle.

Among the phosphors that may be used are $LnOX:Tb^{+3}(:Ce)$ wherein

Ln is one or more of La or Gd,

X is one or more of Cl, Br or I.

$Tb^{+3}$ is present in activator concentrations from a small but effective amount for the production of light up to about 30 mole percent of the composition, and Ce is optionally present in the range of about 0.1 to 1.0 mole percent. The above-described phosphors are highly efficient light producers under cathode ray, ultraviolet and X-ray excitation. They have a radiant energy efficiency when excited by a 20 -kilovolt cathode ray beam of at least about 10 percent and are described in detail in applicant's U.S. Pat. No. 3,617,743.

With these phosphor screens with speed in excess of six time Du Pont Par (standard medium speed reference) have been used. Since LaOBr:Tb phosphor absorbs about twice as much as $CaWO_4$ in the region 40–70 KeV, speeds of only about twice Par can be used if quantum mottle remains about the same.

Actual screens were prepared by standard doctor blade methods using suspensions of phosphors of appropriate brightness. The screens were tested for speed, resolution, film graininess at 80 KV peak, 1 inch Al filtration and 48 inches distance with the Faxitron Unit. These measurements correspond to low contrast conditions of about $\Delta d$=0.1. The film graininess was compared to Du Pont Par screens at exposures of 1.0. The results are presented in Table 1. The visual graininess was less in all cases as compared to the Du Pont Par case. The resolution increased as the screen thickness decreased.

TABLE 1

Comparison of Speed, One Variation and Low Contrast Resolution and Visual Graininess of Various X-ray Screens at 80 KV Peak, 1" Al Filter

| Screen No. | Number of Phosphor Layers | Screen Thickness Mils | Screen Speed | Resolution Line Pairs per mm | One Variation in d Values |
|---|---|---|---|---|---|
| DuPont Par | 1 | 3.9 | 1.0 | 4.2 | .067 |
| 73S831A | 3 | 4.0 | 2.1 | 4.2 | .059 |
| 73S831B | 2 | 2.8 | 1.4 | 5.4 | .058 |
| 73S831C | 3 | 3.0 | 1.7 | 5.0 | .060 |
| 73S831D | 2 | 2.1 | 1.1 | 5.6 | .059 |

Other screens with various combinations of phosphor layers, screen thickness and phosphor brightness have been prepared. The results are in good qualitative agreement with the data presented above.

Thus in the radiographic art, intensifying screens are used in order to reduce the exposure time in producing the image of an object on a silver halide film. Useful information is imparted to the film only by virtue of the X-ray photons which have penetrated the object and are absorbed by the phosphor layer. Increased luminous efficiency of the phosphor layer or proximity of the layer to the film simply reduces the number of absorbed X-ray photons needed to give a desired film exposure. The effect of the state of the art screen construction is to form an image containing the maximum quantum mottle.

EXAMPLE I

The following example illustrates the invention for the case of two contiguous phosphor layers. A screen of the present invention can be constructed in a manner well known to the state of the art. The supporting base to which the phosphor layers are applied consists of a flexible polyester sheet to which a 25 micron titania layer has first been applied by standard doctor blade techniques. The first phosphor layer is applied using the following coating composition:

| | |
|---|---|
| LaOBr.002Tb.0005Yb (Brightness 50) | 400 gm. |
| vinylchloride/vinyl acetate copolymer | 57 gm. |
| methyl isobutyl ketone | 100 gm. |
| methyl ethyl ketone | 65 gm. |
| methanol | 10 gm. |

This mixture is milled for approximately 16 hours to insure complete dispersion. The wet coating thickness is adjusted to give a final dry thickness of 50 microns.

A second phosphor layer is applied over the first dry 50 micron layer. The second phosphor layer has the following coating composition.

| | |
|---|---|
| GdOCl .005 Tb (Brightness 15) | 330 gm. |
| spirit soluble ¼ sec. nitrocellulose (70%) | 45 gm. |
| sucrose acetate isobutyrate | 12 gm. |
| ethyl acetate | 30 gm. |
| methanol | 25 gm. |
| ethanol | 70 gm. |

This mixture is milled for approximately 16 hours to insure complete dispersion. The wet coating thickness is adjusted to give a final dry thickness of 50 microns. A 10 micron clear top protective coating is next applied by means well known to the state of the art.

X-ray screens constructed according to this example had speeds 2.0 times faster than commercial medium-speed calcium tungstate screens. The quantum mottle effect was reduced by about 14%. Resolution was improved over the state of the art screens.

EXAMPLE II

The following example illustrates the invention for the case of three contiguous phosphor layers. The supporting base and reflector layers are constructed as indicated in example 1. The three phosphor layers are applied successively to give in each case a 33 micron thick dry phosphor layer. The following coating composition is used in each case except that the phosphor brightness is different in each case as indicated.

| | |
|---|---|
| LaOBr:Tb, Yb phosphor | 400 gm. |
| vinyl chloride/vinyl acetate copolymer | 57 gm. |
| methyl isobutyl ketone | 100 gm. |
| methyl ethyl ketone | 65 gm. |
| methanol | 10 gm. |

This mixture is milled for approximately 16 hours to insure complete dispersion. The wet coating thickness is adjusted to give a final dry thickness of 33 microns for each phosphor layers. The composition of the phosphor in each layer is as follows;

1. LaOBr 0.002 Tb 0.0005 Yb (brightness of 50) for layer next to reflector
2. LaOBr 0.0005 Tb 0.0005 Yb (brightness of 17) for center layer.
3. LaOBr 0.004 Tb 0.0005 Yb (brightness of 10) for layer next to the film.

A final 10 micron thick clear protective top layer is applied by means well known to the state of the art.

X-ray screens constructed according to this example had speeds of 2.0 times faster than commercial medium-speed calcium tungstate screens. The quantum mottle effect was reduced by about 18%. Resolution was improved over the state of the art screens.

Another advantage of the multilayer phosphor concept is found in the fact that phosphors of distinctly different chemical composition can be used for each layer. This approach allows better absorption of the incident X-ray when elements with suitable $K\alpha$ absorptions are used. The incident beam is initially rich in softer X-rays which can be efficiently absorbed by, for example, LaOBr:Tb. The harder X-rays now penetrate the upper phosphor layer and can be more efficiently absorbed by, for example, GdOCl:Tb. Both phosphor brightnesses are suitably adjusted according to the previously discussed concept. Screens were constructed with GdOCl:Tb in the back screen and again show reduced radiographic mottle.

Another benefit of the multilayer concept involves the reduction of structure mottle due to less tendency toward convection cell formation. It is a well known fact that suspensions of pigments in high polymer organic solvent systems tend to form Bernard or convection cells due to a volcano-like action of the suspension as solvent drying occurs. This tendency to form convection cells is approximately proportional to $L^3$ where L is the wet coating thickness. Thus a 12 mil wet thickness (typical for a final 4 mil dry thickness) would have about 4 times the tendency to form convection cells as would a 6 mil wet thickness needed to form a 2 mil dry layer, thus double coating to achieve two 2 mil layers of phosphor would have less structural mottle.

It will be apparent for the foregoing description of preferred embodiments that other improved X-ray intensifying screens employing the present invention can be constructed. As one example, it is possible to reduce radiographic mottle in the same manner for screens not employing a reflector layer. It is intended to limit the present invention, therefore, only by the scope of the following claims.

What is claimed as new and desired to be secured by Letters Patent of the United States is:

1. An x-ray intensifying screen for reducing radiographic quantum mottle comprising a photographic film and a plurality of contiguous phosphor layers being disposed with respect to said film so that the phosphor layers are of different chemical compositions wherein one of said phosphor compositions is a terbium activated rare-earth oxyhalide phosphor to provide increasing luminous efficiency under x-ray excitation from the phosphor layer nearest the film to the outermost layer, and each of said layers being of such predetermined thickness such that total x-ray absorption and brightness for the plurality of phosphor layers is approximately equal to a single phosphor layer having the same thickness as the total thickness of the plurality of phosphor layers.

2. The X-ray intensifying screen of claim 1 wherein the outermost phosphor layers are comprised of one or more elements with atomic numbers less than 64 and layers nearest the film are comprised of one or more elements with atomic numbers greater than 58.

3. An x-ray intensifying screen, according to claim 1, comprising two phosphor layers, said layers comprised of LaOBr:Tb having different terbium concentrations such that the outermost layer is about 3 to 4 times as bright as the phosphor layer nearest the film, said layers having thicknesses of 20–60 microns each.

4. An x-ray intensifying screen according to claim 1, comprising three, 15–40 micron thick, phosphor layers, said layers composed of LaOBr:Tb having different terbium concentrations such that the brightness ratios of 1 to 1.5–2.5, to 3.0–4.5 for the layer nearest the film, the middle layer and the outermost layer respectfully.

5. An X-ray intensifying screen according to claim 1 comprising two, 20–60 micron thick, contiguous phosphor layers, said layers of decreasing luminous efficiency under X-ray excitation comprising LaOBr:Tb for the outermost layer and GdOCl:Tb for the layer nearest the film.

6. An X-ray intensitying screen according to claim 1 comprising two, 20–60 micron thick contiguous phosphor layers, said layers of decreasing luminous efficiency under X-ray excitation comprising LaOBr:Tb for the outermost layer and $Gd_2o_2S$:Tb for the layer nearest the film.

7. An x-ray intensifying screen for reducing radiographic quantum mottle comprising a photographic film, a reflector spaced therefrom and a plurality of phosphor layers between said film and said reflector, said phosphor layers being of different chemical compositions wherein one of said phosphor compositions is a terbium activated rare-earth oxyhalide phosphor, the phosphor layer nearest the reflector having greater brightness under x-ray excitation than the phosphor layer nearest the film and each of said layers being of such predetermined thickness such that total x-ray absorption and brightness for the plurality of phosphor layers is approximately equal to a single phosphor layer having the same thickness as the total thickness of the plurality of phosphor layers.

* * * * *